United States Patent
Yang et al.

(10) Patent No.: US 8,576,918 B2
(45) Date of Patent: Nov. 5, 2013

(54) METHOD AND APPARATUS FOR SIGNALING AND DECODING AVS1-P2 BITSTREAMS OF DIFFERENT VERSIONS

(75) Inventors: Zhijie Michael Yang, Beijing (CN); Xuemin Shermin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1428 days.

(21) Appl. No.: 12/142,409

(22) Filed: Jun. 19, 2008

(65) Prior Publication Data
US 2009/0016446 A1    Jan. 15, 2009

Related U.S. Application Data

(60) Provisional application No. 60/948,553, filed on Jul. 9, 2007.

(51) Int. Cl.
H04N 7/26      (2006.01)

(52) U.S. Cl.
USPC .................. 375/240.25; 341/50; 382/236

(58) Field of Classification Search
USPC ............ 375/240.24, 240.25, 240.15, 240.16, 375/240, 240.1; 382/236; 341/107, 50; 706/48
See application file for complete search history.

(56) References Cited

U.S. PATENT DOCUMENTS

| | | | |
|---|---|---|---|
| 7,822,121 B2 * | 10/2010 | Rangam et al. | 375/240.16 |
| 7,932,843 B2 * | 4/2011 | Demircin et al. | 341/107 |
| 2004/0030665 A1 * | 2/2004 | Sullivan | 706/48 |
| 2005/0169544 A1 * | 8/2005 | Clark | 382/236 |
| 2006/0050793 A1 * | 3/2006 | Wang et al. | 375/240.25 |
| 2006/0083298 A1 * | 4/2006 | Wang et al. | 375/240.01 |
| 2006/0119490 A1 * | 6/2006 | Lim et al. | 341/50 |
| 2006/0120463 A1 * | 6/2006 | Wang | 375/240.25 |
| 2006/0171471 A1 * | 8/2006 | Zhou | 375/240.25 |
| 2007/0076799 A1 * | 4/2007 | Wan | 375/240.25 |
| 2007/0297501 A1 * | 12/2007 | Hussain et al. | 375/240 |
| 2008/0231483 A1 * | 9/2008 | He et al. | 341/107 |
| 2008/0304757 A1 * | 12/2008 | Chen et al. | 382/232 |
| 2009/0313029 A1 * | 12/2009 | Luo et al. | 704/500 |
| 2010/0034254 A1 * | 2/2010 | Wang | 375/240.01 |

OTHER PUBLICATIONS

Chang et al, Overview of AVS video tools, performance and complexity, 2005.*
Xu, Transport of GB 20090.2 video over ITU-T Rec. H.222.0|ISO/IEC 13818-1, 2007.*

(Continued)

*Primary Examiner* — Michael Thier
*Assistant Examiner* — Vincelas Louis
(74) *Attorney, Agent, or Firm* — Thomas | Horstemeyer, LLP

(57) ABSTRACT

Aspects of a method and system for signaling and decoding AVS1-P2 bitstreams of different versions are provided. A sequence user data indicating decoding version information such as a decoding version identifier, for example, may inserted into an AVS1-P2 bitstream. The decoding version information may be, for example, AVS1-P2 Rm52j_r1 or AVS1-P2. The AVS1-P2 bitstream may be decoded based on the decoding version information. The sequence user data may be inserted in the AVS1-P2 bitstream during AVS encoding or during AVS1-P2 bitstream transcoding. Upon receiving the AVS1-P2 bitstream, the sequence user data may be detected and extracted to determine the decoding version information. The received encoded AVS1-P2 bitstream may be decoded based on the decoding version information. When no specific decoding version information can be decided, default decoder version information may be used by the video decoder.

24 Claims, 4 Drawing Sheets

| 202 | 204 | 206 | 206 |
|---|---|---|---|
| Sequence Header Start Code | Sequence Header | Inserted Sequence User Data | Data Payload |

(56) References Cited

OTHER PUBLICATIONS

Wang, AVS-M standards to applications, 2006.*
Chen, The emerging video coding standard—AVS, 2006.*
Yun et al, Introductions for AVS—P2, 2006.*
European Search Report corresponding to European Patent Application Serial No. 08011603.1-2223, dated Dec. 15, 2008.
Gao et al., "AVS—The Chinese Next-Generation Video Coding Standard." NAB, Apr. 22, 2004.
Cardenas, "Elementary stream" Wikipedia, Jun. 22, 2007.
Husemann et al., "An approach to increase the performance of motion estimation algorithms implemented in hardware." ACM, vol. 192, Nov. 22, 2006.
Dutta, "Smart Video Streams" 101 Uses of the User Data Field in MPEG, 1996 IEEE Proceedings of ASILOMAR-29, pp. 1462-1466, Oct. 30, 1995.

* cited by examiner

METHOD AND APPARATUS FOR SIGNALING AND DECODING AVS1-P2 BITSTREAMS OF DIFFERENT VERSIONS

CROSS-REFERENCE TO RELATED APPLICATIONS/INCORPORATION BY REFERENCE

This application claims the benefit of U.S. Provisional Application No. 60/948,553, filed on Jul. 9, 2007.

FIELD OF THE INVENTION

Certain embodiments of the invention relate to video signal processing. More specifically, certain embodiments of the invention relate to a method and system for signaling and decoding AVS1-P2 bitstreams of different versions.

BACKGROUND OF THE INVENTION

The Audio Video Coding Standard of China (AVS) is a streamlined, highly efficient video coder employing the latest video coding tools for high definition and high quality video services. AVS provides video coding algorithms that are optimized between absolute coding performance and complexity of implementation. Exemplary AVS applications may comprise broadcast TV, HD-DVD, and broadband video networking.

AVS is a set of standards comprising AVS1-P1 (System for broadcast), AVS1-P2 (Video for HD), AVS1-P3 (Audio, 2 and 5.1 channels), AVS1-P6 (DRM), AVS1-P8 (Video for mobile), and AVS1-P9 (File format). The AVS1-P2 Jizhun profile has been standardized, and other portions of AVS are currently being work on. The AVS1-P2 video codec has a very broad application range that covers various forms of digital compressed video from low bit-rate Internet streaming applications to HDTV broadcast and Digital Cinema applications with nearly lossless coding.

The AVS1-P2 specification defines AVS1-P2 bitstream syntax and specifies a complete process required to decode the bitstream. The AVS1-P2 bitstream is defined as a hierarchy of layers with a video sequence layer as the outermost layer, a picture layer, a slice layer, a macroblock layer and a block layer, accordingly. A start code based bitstream structure has been adopted in the AVS1-P2 specification. Each layer of the AVS1-P2 bitstream begins with a unique start code allowing a decoder's parser to find each layer within the AVS1-P2 bitstream.

The AVS working group provides two reference models of the AVS1-P2 bitstream in the AVS specification version AVS1-P2 Rm52j_r1 and the AVS specification version AVS1-P2, respectively. The reference model of the AVS1-P2 bitstream in the AVS specification version AVS1-P2 Rm52j_r1 is not fully compliant with the AVS specification version AVS1-P2. For example, in direct mode of the AVS specification version AVS1-P2 Rm52j_r1, for the derivation process of, for example, DistanceIndexRef, a current picture is field coded while a backward reference picture is frame coded. This is different from the derivation process in the AVS specification version AVS1-P2.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for signaling and decoding AVS1-P2 bitstreams of different versions, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for signaling and decoding AVS1-P2 bitstreams of different versions. Various aspects of the invention may comprise inserting decoding version information such as a decoding version identifier, for example, in an AVS1-P2 bitstream. The AVS1-P2 bitstream may be decoded based on the inserted decoding version information. The decoding version information may be inserted in the AVS1-P2 bitstream during AVS encoding or during AVS1-P2 bitstream transcoding. The AVS1-P2 bitstream may conform to the decoding version of AVS1-P2 Rm52j_r1 or AVS1-P2. At a video decoder, the AVS1-P2 bitstream may be first parsed to detect and extract the decoding version information in the received AVS1-P2 bitstream. The extracted decoding version information may be evaluated to determine a decoding version ID. The video decoder may decode the received encoded AVS1-P2 bitstream based on the decoding version ID. When no specific decoding version ID can be determined, a default decoder version ID may be used by the video decoder. The decoding version information may be represented by a specific sequence of user data and may be inserted at the end of a sequence header of corresponding AVS1-P2 bitstream.

Figure 1:
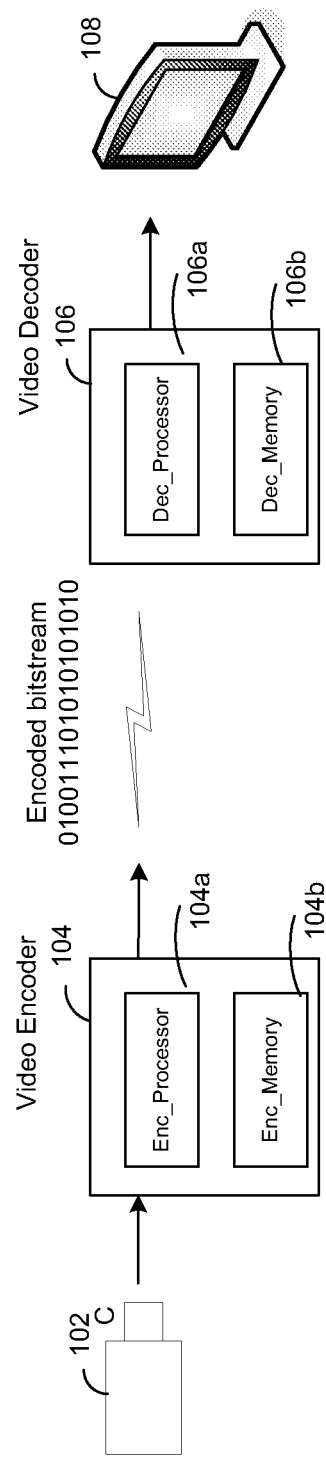
FIG. 1 is a block diagram of an exemplary video coding system, in accordance with an embodiment of the invention.

FIG. 1 is a block diagram of an exemplary video coding system, in accordance with an embodiment of the invention. Referring to FIG. 1, there is shown a video source 102, a video encoder 104, a video decoder 106, and a video display 108. The video encoder may comprise an encoding processor (enc_processor) 104a and an encoding memory (enc_memory) 104b. The video decoder 106 may comprise a decoding processor (de_processor) 106a and a decoding memory (dec_memory) 106b.

The video source 102 may comprise suitable logic, circuitry and/or code that may provide a video stream from, for example, a camcorder, VCR, CCD camera, or from an Internet video stream.

The encoding processor 104a may comprise suitable logic, circuitry and/or code that may be enabled to convert a video stream from the video source 102 into a compressed format by using as few bits as possible while acceptably maintaining the visual appearance. In this regard, a user data sequence comprising decoding version information may be inserted into the encoded bitstream for decoding the encoded bitstream syntax to produce a displayable video imagery sequence.

The encoding memory 104b may comprise suitable logic, circuitry and/or code that may comprise instructions executable by, for example, the encoding processor 104a. A user data sequence comprising decoding version information may be stored in the encoding memory 104b. The encoding memory 104b may be coupled to the encoding processor 104a and may be FLASH memory, electronically erasable programmable memory (EEPROM), or DRAM.

The decoding processor 106a may comprise suitable logic, circuitry and/or code that may be used to convert a compressed video stream back into an uncompressed format. The video decoder 106 may decode the encoded bitstream based on the decoding version information in the received video data and recreate a sequence of video images.

The decoding memory 106b may comprise suitable logic, circuitry and/or code that may comprise instructions executable by, for example, the decoding processor 106a. A user data sequence comprising decoding version information may be stored in the decoding memory 106b. The decoding memory 106b may be coupled to the decoding processor 106a and may be FLASH memory, electronically erasable programmable memory (EEPROM), or DRAM.

The video display 108 may comprise suitable logic, circuitry and/or code that may be a device, for example, a computer output device to present visual images with analog or digital video inputs.

In operation, the video source 102 may provide a video stream from a camcorder or from an Internet video stream. The video encoder 104 may carry out various AVS specific prediction, transformation and/or encoding processes to create an encoded AVS bitstream. In this regard, the encoded AVS bitstream may be expanded by inserting a specific user data sequence. The specific user data sequence may carry the syntax information for the encoded AVS bitstream such as the specific AVS specification version, for example, AVS1-P2 Rm52j_r1 or AVS1-P2. The specific AVS specification version may identify which AVS version the encoded AVS bitstream may conform to. The expanded encoded AVS bitstream may be sent to the decoder 106 over an intermediate medium such as a wireless channel or a DVD. The video decoder 106 may decode the encoded AVS bitstream based on the syntax information of the specific user data sequence and produce a decoded video sequence. The video display 108 may present the decoded video sequence as visual images accordingly.

Figure 2:
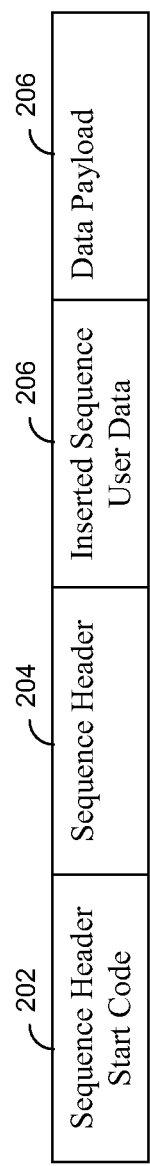
FIG. 2 is diagram illustrating an exemplary AVS1-P2 bitstream structure, in accordance with an embodiment of the invention.

FIG. 2 is diagram illustrating an exemplary AVS1-P2 bitstream structure, in accordance with an embodiment of the invention. Referring to FIG. 2, there is shown a sequence header start code 202, a sequence header 204, a sequence user data 206, and a video data payload 208.

The start code 202 may be a unique code with a value of 0x000001. The start code 202 may be byte-aligned to be used for providing AVS encoded bitstream synchronization.

The sequence header 204 may be placed in the AVS1-P2 bitstream to provide necessary information needed to decode the data payload and support user access appropriately for the given distribution medium. For example, the sequence header 204 may be placed at the start of each chapter on a DVD to facilitate random access or may be placed every ½-second in broadcast TV to facilitate changing channels.

The sequence user data 206 may be used to provide, for example, some vendor specific information. In this regard, a vendor specific sequence user data may be defined to indicate which specific AVS specification version such as AVS1-P2 Rm52j_r1 or AVS1-P2 the corresponding AVS1-P2 bitstream may comply with. The sequence user data 206 may be inserted into the AVS1-P2 bitstream, for example, after the sequence header. An exemplary sequence user data 206 may be as follows:
the sequence user data 206—'AVS1P2RM52JR1'
00 00 01 B2 41 56 53 31 50 32 52 4D 35 32 4A 52 31 6
or
the sequence user data 206—'AVS1P2SPEC'
00 00 01 B2 41 56 53 31 50 32 53 50 45 43
The video data payload 208 may comprise actual video data information.

Figure 3:
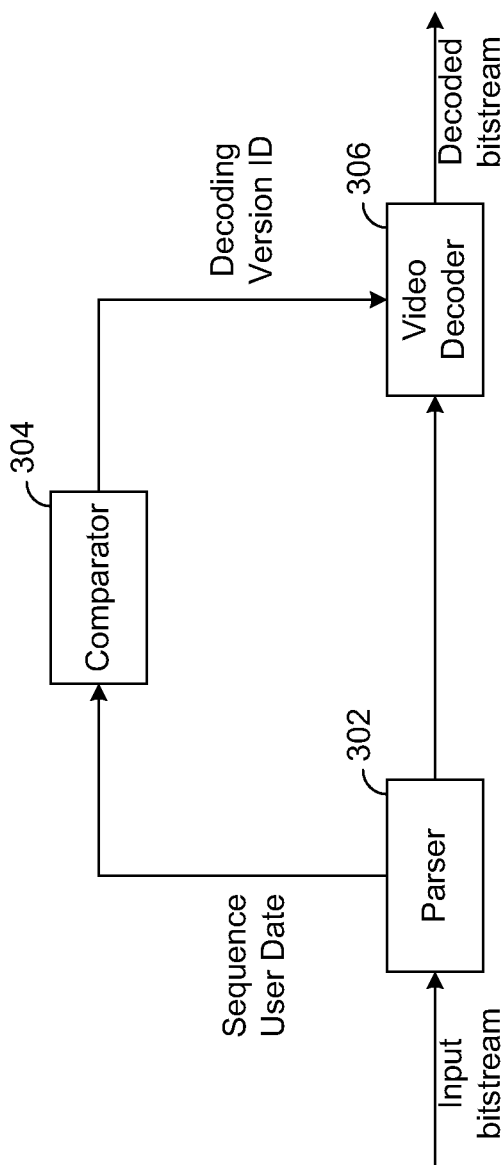
FIG. 3 is a block diagram of an exemplary video decoder, in accordance with an embodiment of the invention.

FIG. 3 is a block diagram of an exemplary video decoder, in accordance with an embodiment of the invention. Referring to FIG. 3, there is shown a parser 302, a comparator 304, and an AVS decoder 306.

The parser 302 may comprise suitable logic, circuitry and/or code that may be enabled to analyze and classify the received AVS1-P2 bitstream. For example, the start code within the received AVS bitstream may be parsed for resynchronization and identification. The parser 302 may detect and extract the unique sequence user data 206 within the received AVS bitstream. The parser 302 may pass the extracted unique sequence user data information to the comparator 304 while the encoded AVS bitstream may be communicated to the AVS decoder 306, respectively.

The comparator 304 may comprise suitable logic, circuitry and/or code that may be operable to compare the extracted unique sequence user data information from the parser 302 to a stored AVS decoding version list. Based on the comparison, decoding version information to be used for decoding the encoded AVS bitstream may be determined. The AVS decoding list may comprise a mapping of a sequence user data such as AVS1P2RM52JR1 or AVS1P2SPEC to a decoding version ID, for example, 0 or 1. The comparator 304 may pass the decoding version ID to the AVS decoder 306. In instances where no valid sequence user data information may be available in the received AVS bitstream, a default decoding version ID may be communicated to the AVS decoder 306.

The AVS decoder 306 may comprise suitable logic, circuitry and/or code that may decode the encoded AVS bitstream based on the decoding version provided by the comparator 304.

In operation, upon receiving an encoded AVS1-P2 bitstream, the parser 302 may analyze and classify the received AVS1-P2 bitstream. Once a sequence user data within the received encoded AVS1-P2 bitstream being detected, the parser 302 may extract the detected sequence user data and pass the extracted sequence user data to the comparator 304. The comparator 304 may compare the received sequence user data to a decoding version list to determine a decoding version ID and pass to the AVS decoder 306. The AVS decoder 306 may be operable to decode the encoded AVS1-P2 bitstream based on the decoding version ID. In instances where the received encoded AVS1-P2 bitstream may not comprise a sequence user data or may comprise a sequence user data that does not match a valid decoding version ID, the comparator 304 may pass a default decoding ID to the decoder 306 to decode the encoded AVS bitstream accordingly.

Figure 4:
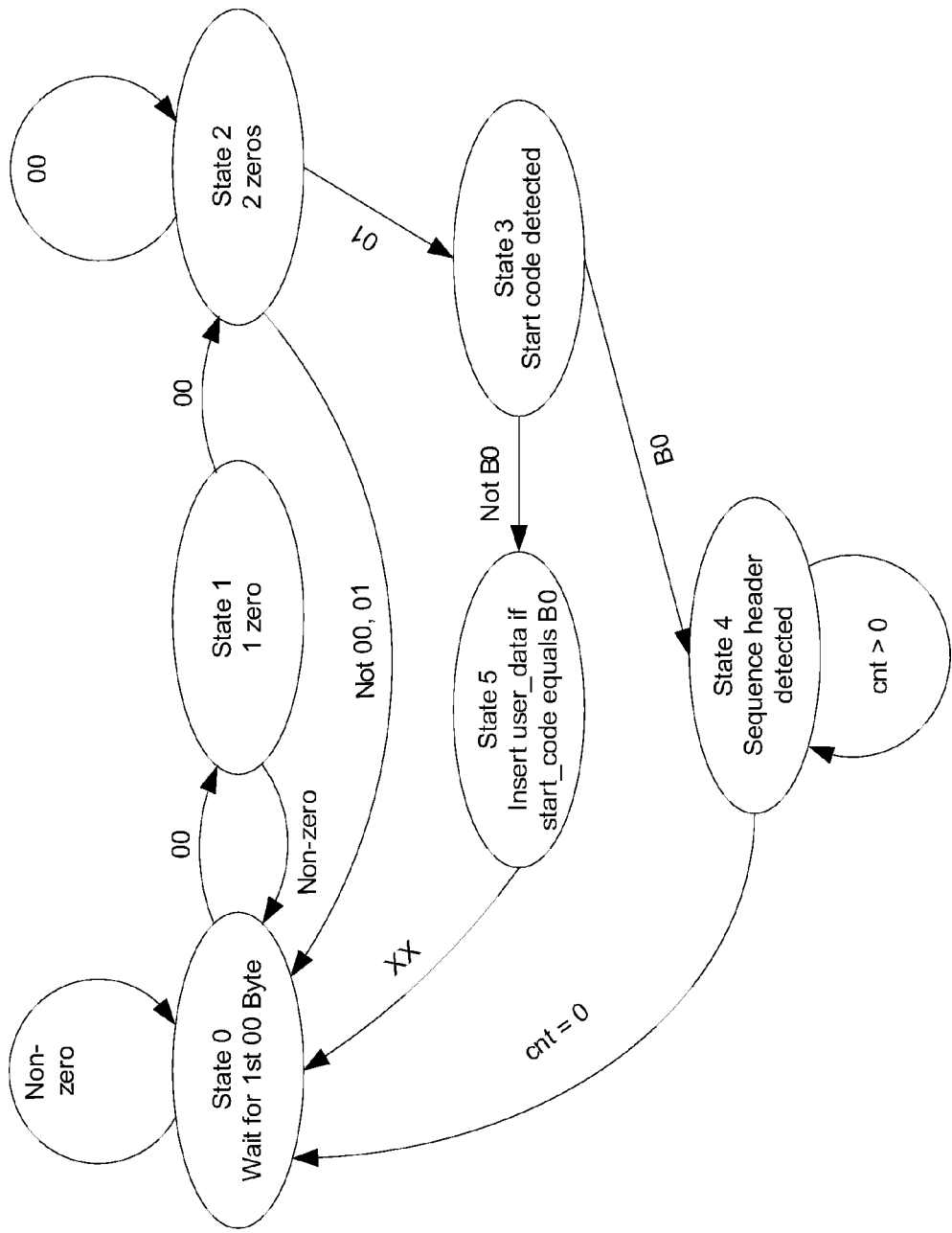
FIG. 4 is diagram illustrating an exemplary AVS1-P2 bitstream transcoding, in accordance with an embodiment of the invention.

FIG. 4 is a diagram illustrating an exemplary AVS1-P2 bitstream transcoding, in accordance with an embodiment of the invention. Referring to FIG. 4, there is shown an exemplary state machine with state 0, state 1, state 2, state 3, state 4, and state 5.

The state machine may transit among different states according to different input byte values. The state machine may be reset and start with the state 0. At the state 0, an input of "00" may result in a transition from state 0 to the state 1. Otherwise the state machine remains in the state 0. At the state 1, the state machine may transition from the state 1 to the state 2 with an input of "00". Otherwise, the state machine may be reset from the state 1 back to the state 0. At the state 2, an input of "00" may cause state machine to remain in the state 2. An input of "01" may result in a transition from the state 2 to the state 3. Otherwise, the state machine may be reset from the state 2 back to the state 0.

At the state 3, the state machine may detect a start code. An input of "B0" may result in a transition from the state 3 to the state 4. Otherwise, the state machine may transition to the state 5. At the state 4, the state machine may declare the detection of a sequence header. A counter may be set to, for example, the number of bytes of a portion of the sequence header. A specific sequence user data comprising decoding version information may be inserted when the counter may count down to zero and the state machine may be reset to the state 0. Otherwise, the state machine may remain in the state 4. At the state 5, the state machine may determine that neither a sequence header nor a start code has been detected and may transition to the state 0 regardless the upcoming input byte value.

Aspects of a method and system for signaling and decoding AVS1-P2 bitstreams of different versions are provided. In accordance with various embodiments of the invention, decoding version information may be inserted in an AVS1-P2 bitstream. The AVS1-P2 bitstream may be decoded based on the decoding version information. The decoding version information may be inserted in the AVS1-P2 bitstream during AVS encoding (FIG. 2) or during AVS1-P2 bitstream transcoding (FIG. 4). The AVS1-P2 bitstream may comply with the decoding version of AVS1-P2 Rm52j_r1 or AVS1-P2. Before being decoded, the AVS1-P2 bitstream may be parsed at the parser 302 to identify and extract, for example, the decoding version information in the received AVS1-P2 bitstream. The extracted decoding version information may be evaluated at the comparator 304 to determine a decoding version ID and pass to the AVS decoder 306. When no decoding version ID or invalid decoding version ID may be included in the received AVS1-P2 bitstream, the comparator 304 may pass a default decoding version ID to the AVS decoder 306 for decoding the received encoded AVS1-P2 bitstream. The decoding version information may be indicated by a specific sequence user data 206. The specific sequence user data 206 may be inserted at the end of a sequence header 204 of the AVS1-P2 bitstream.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for signaling and decoding AVS1-P2 bitstreams of different versions.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments failing within the scope of the appended claims.

What is claimed is:

1. A method, comprising:
when decoding version information is detected within a sequence user data field of an Audio Video Coding Standard of China (AVS) bitstream;
decoding said AVS bitstream based at least in part on said decoding version information, said decoding version information indicating one of a plurality of different AVS versions, wherein said decoding version information was inserted in said AVS bitstream during coding of said AVS bitstream; and
when said decoding version information is not detected within said sequence user data field of said AVS bitstream;
decoding said AVS bitstream based at least in part on default decoding version information.

2. The method according to claim 1, wherein said decoding version information specifies a particular AVS format that was utilized for said coding of said AVS bitstream.

3. The method according to claim 1, wherein said decoding version information was inserted in said AVS bitstream during encoding of said AVS bitstream.

4. The method according to claim 1, wherein said decoding version information was inserted in said AVS bitstream during transcoding of said AVS bitstream.

5. The method according to claim 1, wherein said AVS bitstream is an AVS1-P2 formatted bitstream.

6. The method according to claim 1, wherein said AVS bitstream is an AVS1-P2 Rm52j_r1 formatted bitstream.

7. The method according to claim 1, wherein said sequence user data field is in a sequence header portion of said AVS bitstream.

8. The method according to claim 1, comprising parsing said AVS bitstream to determine said decoding version information.

9. A system, comprising:
one or more processors operable to:
when decoding version information is detected within a sequence user data field of an Audio Video Coding Standard of China (AVS) bitstream;
decode said AVS bitstream based at least in part on said decoding version information, said decoding version information indicating one of a plurality of different AVS versions, wherein said decoding version information was inserted in said AVS bitstream during coding of said AVS bitstream; and when said decoding version information is not detected within said sequence user data field of said AVS bitstream;

decode said AVS bitstream based at least in part on default decoding version information.

10. The system according to claim 9, wherein said decoding version information specifies a particular AVS format that was utilized for said coding of said AVS bitstream.

11. The system according to claim 9, wherein said decoding version information was inserted in said AVS bitstream during encoding of said AVS bitstream.

12. The system according to claim 9, wherein said decoding version information was inserted in said AVS bitstream during transcoding of said AVS bitstream.

13. The system according to claim 9, wherein said AVS bitstream is an AVS1-P2 formatted bitstream.

14. The system according to claim 9, wherein said AVS bitstream is an AVS1-P2 Rm52j_r1 formatted bitstream.

15. The system according to claim 9, wherein said sequence user data field is in a sequence header portion of said AVS bitstream.

16. The system according to claim 9, wherein said one or more processors are operable to parse said AVS bitstream to determine said decoding version information.

17. A system, comprising:

means for detecting decoding version information within a sequence user data field of an Audio Video Coding Standard of China (AVS) bitstream, said decoding version information indicating one of a plurality of different AVS versions, wherein said decoding version information was inserted in said AVS bitstream during coding of said AVS bitstream;

means for decoding said AVS bitstream based at least in part on said decoding version information when said decoding version information is detected; and means for decoding said AVS bitstream based at least in part on default decoding version information when said decoding version information is not detected.

18. The system according to claim 17, wherein said decoding version information specifies a particular AVS format that was utilized for said coding of said AVS bitstream.

19. The system according to claim 17, wherein said decoding version information was inserted in said AVS bitstream during encoding of said AVS bitstream.

20. The system according to claim 17, wherein said decoding version information was inserted in said AVS bitstream during transcoding of said AVS bitstream.

21. The system according to claim 17, wherein said AVS bitstream is an AVS 1-P2 formatted bitstream.

22. The system according to claim 17, wherein said AVS bitstream is an AVS 1-P2 Rm52j_r1 formatted bitstream.

23. The system according to claim 17, wherein said sequence user data field is in a sequence header portion of said AVS bitstream.

24. The system according to claim 17, wherein said means for detecting is configured to parse said AVS bitstream to determine whether said decoding version information is present.

* * * * *